INVENTORS
HAROLD GOLDBERG
WALTER C. THOMPSON
BY
ATTORNEY

Aug. 13, 1946.  H. GOLDBERG ET AL  2,405,930
SYNCHRONIZING ARRANGEMENT FOR LOCATOR SYSTEMS
Filed Feb. 7, 1944  2 Sheets-Sheet 2

INVENTORS
HAROLD GOLDBERG
WALTER C. THOMPSON
BY
ATTORNEY

Patented Aug. 13, 1946

2,405,930

UNITED STATES PATENT OFFICE 2,405,930

SYNCHRONIZING ARRANGEMENT FOR LOCATOR SYSTEMS

Harold Goldberg, Irondequoit, and Walter C. Thompson, Rochester, N. Y., assignors to Stromberg-Carlson Company, Rochester, N. Y., a corporation of New York Application February 7, 1944, Serial No. 521,461

13 Claims. (Cl. 250—11)

This invention relates to a synchronizing arrangement and more particularly to a synchronizing arrangement for use in a radio locator system.

In some applications of a pulse echo type of radio locating system, there may be provided a rotating dipole antenna assembly projecting along the main axis of a parabolic reflector. The antenna pattern developed by the rotating dipole assembly or the equivalent antenna structure mainly comprises a traveling beam of exploring pulses inclined with respect to said axis and directed away from said reflector. As this beam rotates through a path of 360 degrees, it is desired to effect exploration in each lobe or quadrant of this path. At the same time, the exploring pulses are reflected back from the target as echo pulses to deflect the beams of cathode ray tubes, associated wtih a suitable receiver, to display visual indications of the target. In effecting the exploring and indicating operations, it becomes necessary to bring about in each quadrant a control result known as a lobe switching operation. properly synchronized with respect to the first mentioned operations. This lobe-switching is accomplished by developing a pulse of radio frequency energy for every quadrant or ninety degrees of rotation of the antenna assembly. The mentioned synchronization is effected by the synchronizing arrangement of the present invention which is utilized to relate the rotation of the dipole assembly, the transmission of exploring pulses thereover and the initiation of the proper sweeps on the cathode ray tubes. By this synchronization, the displayed images or "pips" of the reflected pulses or echoes, on the cathode ray tubes, will enable the operator to track the target in two mutually perpendicular coordinates by means of equalizing the amplitude of the displayed images.

In the past, this synchronization has been effected by the use of very complex generators furnishing square waves directly therefrom.

In accordance with the present invention, a synchronizing arrangement is provided which is simple in construction and which functions reliably irrespective of the speed of rotation of the dipole assembly.

For a clearer understanding of the invention, reference is made to the following description and claims when taken with the drawings in which:

Figure 1:
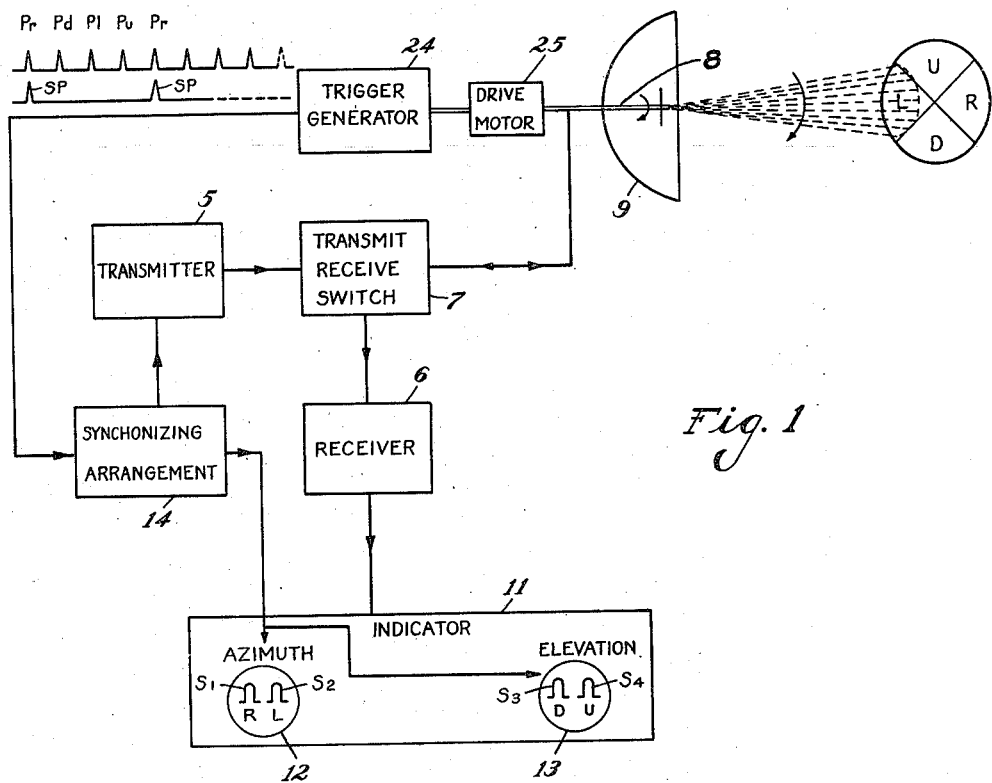
Fig. 1 is a block diagram of a position indicating system having incorporated therein a synchronizing arrangement of the present invention.

The position indicating system illustrated diagrammatically in Fig. 1 is of the pulse echo type. In this system, there is provided a transmitter 5 of exploring pulses and a receiver 6 for reflected or echo pulses. The transmitter 5 under the control of a well-known transmitter and receiver switching network 7 feeds the exploring impulses to a rotating dipole antenna assembly 8. This antenna assembly projects through a parabolic reflector 9 and along the axis thereof. The dipole antenna 8 rotates continuously and radiates the exploring impulses around a field or path of 360 degrees which path may be conveniently considered as comprising four lobes or quadrants, designated L (left), U (up), R (right) and D (down).

The exploring impulses radiated by the antenna assembly are reflected back as echo pulses to this assembly and are fed through the transmitter-receiver switching network 7 to the receiver 6. The signals thus supplied to the receiver are utilized to actuate an indicator 11, which comprises two cathode ray tubes 12 and 13. The cathode ray tube 12 is utilized to display an azimuth indication of the target, that is, an indication with respect to right or left along a horizontal path while the cathode ray tube 13 presents an indication of the target with respect to elevation, that is, as regards the position of the target in a so-called up and down direction.

Figure 2:
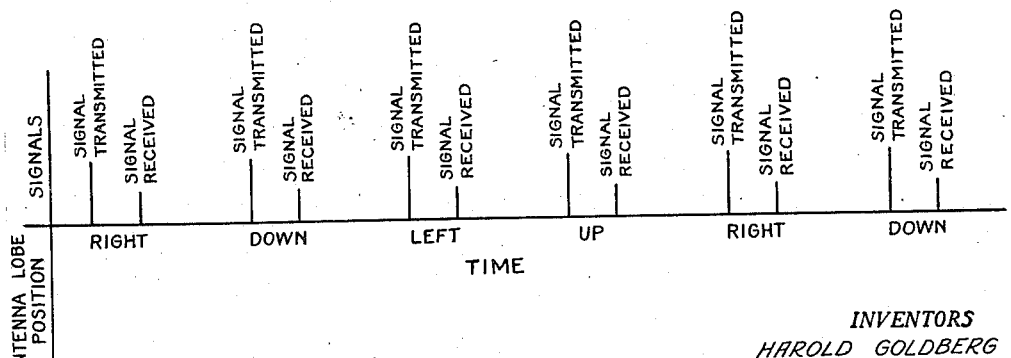
Fig. 2 is a chart showing the relation between the antenna position and the pulses or signals transmitted and received.

The synchronizing arrangement 14 of the present invention is used to properly relate the rotation of the antenna assembly together with the transmission of the exploring pulses and the initiation of the proper sweeps on the cathode ray tubes 12 and 13 of the indicator, as shown in the chart of Fig. 2, so that the display of the pulse echoes will enable the operator to track the target in two mutually perpendicular coordinates. As indicated schematically in Fig. 1, the target image will appear on each cathode ray tube 12 as a pair of displaced deflection peaks S1 and S2, and will appear on cathode ray tube 13 as a pair of displaced deflection peaks S3 and S4. When the pair of peaks visible on a given tube are of equal height, this condition indicates that the antenna assembly 8 is trained on the target at least as far as the coordinate related to this tube is concerned. If the pair of spaced peaks, visible on each of the cathode ray tubes 12 and 13, are of equal height, this indicates that the antenna assembly is trained on the target both as to elevation and as to azimuth. If, however, the antenna is not so trained, the echoes or peaks are of unequal height and the dipole antenna must be repositioned until the echoes or peaks for a given coordinate are of equal height. The displacement of the sweeps and the unblanking of the cathode ray tubes so that the two echoes are displaced and only echoes from the proper lobes or quadrants are displayed, is accomplished by the use of square waves of proper polarity and frequency.

Figure 3:
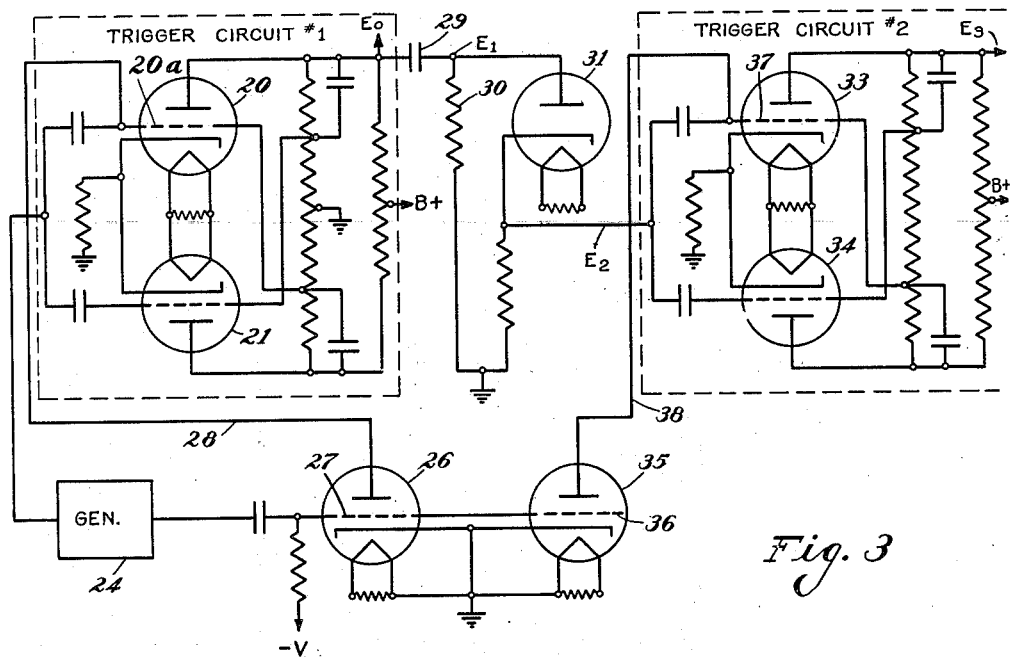
Fig. 3 is a diagrammatic showing of the synchronizing arrangement of the present invention.
Figure 4:
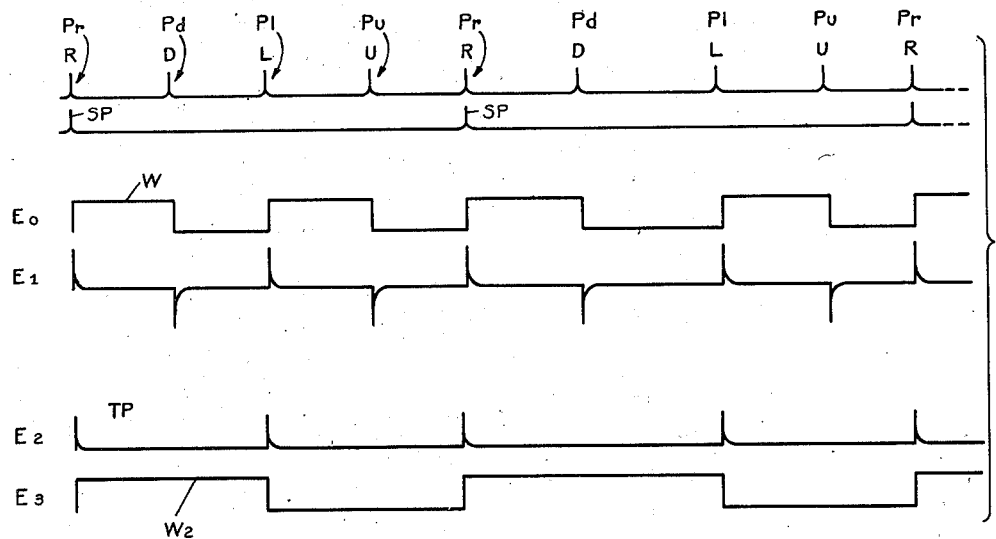
Fig. 4 is a chart useful in explaining the invention.

These square waves must have a fixed relation to the rotation and position of the rotating dipole antenna assembly 8, if the sense of the displays relative to the rotating feed, is to be maintained. Furthermore, the exploring pulse must be sent out at the proper time relative to the position or angular degree of rotation of the rotating dipole antenna assembly. The necessary square waves are generated in a so-called trigger circuit, which may be one of the Eccles-Jordan trigger circuits, disclosed on pages 172 and 173 of "Ultra-High Frequency Techniques" by Brainerd, Koehler, Reich and Woodruff, published in 1942. However, the trigger circuit disclosed within the broken line rectangle in Fig. 3, is an improvement over those prior arrangements in that the need for fixed bias therein has been obviated. This trigger circuit includes two vacuum tubes 20 and 21, so electrically connected that the trigger circuit has two stable states, in the first of which vacuum tube 20 is conducting, vacuum table 21 is non-conducting and in the second state vacuum tube 21 becomes conducting and vacuum tube 20 non-conducting. The trigger circuit is caused to change from one state to the other by the application thereto of a so-called triggering pulse, such as $P_r$, $P_d$, $P_l$, or $P_u$ of Fig. 4, which may be of positive or negative polarity, as desired, although it is preferred to use positive polarity. On the application of the positive pulse to such a trigger circuit, it will quickly change to the converse state from the state it was in before the trigger pulse was applied. In changing from one state to the other, so-called square waves, as illustrated in Fig. 4, are developed. It will be understood that the trigger pulses need not be applied periodically since the circuit will stay in a given stable state as long as no trigger voltage is applied.

In the present arrangement, the trigger pulses are generated by a trigger generator 24 driven by the motor 25 which also rotates the antenna assembly 8. This generator is arranged to develop four impulses $P_r$, $P_d$, $P_l$, and $P_u$ for each rotation of the antenna assembly, the four pulses being so spaced in relation to time that one pulse is related or corresponds to each lobe or quadrant through which the antenna rotates in effecting a complete rotation. The generator, by way of example, may develop 200 volts at a a rotational rate of 3800 R. P. M. Since the voltage output is proportional to the speed of rotation, the generator must be designed to develop sufficient voltage throughout the range of rotating speeds to be encountered in operation. The mentioned trigger impulses developed by the generator cause the trigger circuit to change alternately from one of its stable states to the other and then back again to produce the desired square wave. The square wave thus developed does not have a distinct relation to the position of the rotating antenna. Consequently, when the system is first started in operation, the particular vacuum tube in the trigger circuit, found in the conducting state, is subject to change. Also, the first trigger pulse to reach the circuit will cause it to change from the prevailing stable state to the alternative stable state. Therefore, it is possible to have either the correct or the incorrect relation between the rotating antenna 8 and the square wave impressed on the cathode ray tubes 12 and 13.

In order to eliminate the possibility of such error, there is provided in accordance with the present invention a synchronizing trigger impulse in addition to the four trigger impulses per rotation, already referred to. This trigger impulse is likewise generated by the trigger generator and will therefore be properly correlated with respect to the rotating antenna 8. This synchronizing pulse, is applied to a corrector circuit including a vacuum tube 26 which functions to eliminate the above mentioned ambiguity. If the trigger circuit starts incorrectly, that is, in improper relation to the rotation of the antenna 8, the first application of the synchronizing pulse will correct this ambiguity. The mentioned vacuum tube 26 is normally biased to cut off, but when the synchronizing pulse is applied to the grid 27 of this triode, it drives the grid positive so that the triode 26 conducts between its plate and cathode. This effectively connects the grid 20a of the vacuum tube 20 to ground through conductor 28, which condition is sufficient to change the trigger circuit immediately to the particular stable state in which tube 20 is conducting since the mentioned connection to ground will override any effect due to one of the four triggering pulses, previously mentioned. If, however, the corrector circuit receives its synchronizing pulse when the vacuum tube 20 is conducting, then the corrector circuit will have no effect. In addition, if the trigger circuit gets out of step during operation, it is corrected in the same manner within one revolution of the antenna 8 since a synchronizing pulse is generated in the course of each rotation thereof. Consequently, the trigger circuit is continuously checked for proper operation.

Although the square wave generated in the apparatus thus far described is adequate to operate certain position indicating systems, it is preferred herein to employ two independent trains of square waves each fixed in its relation to the rotating antenna 8. One of the square wave trains W is the same as that already discussed but the second square wave train W2 is of one-half this frequency. The method of obtaining a square wave of half the frequency used herein involves differentiation, as indicated at $E_1$, (Fig. 4), of the first square wave by condenser 29 and resistor 30 and then rectification by the diode rectifier 31 to eliminate the negative portion of the resultant wave. This results in trigger pulses TP of one-half the frequency of that furnished as $P_r$, $P_d$, $P_l$, and $P_u$. These trigger pulses TP actuate a second trigger circuit of the character already described and including the vacuum tubes 33 and 34 to produce square waves $W_2$ of one-half of the frequency of square wave W. This second trigger circuit, in the absence of the present synchronizing arrangement, can operate in improper relation to the rotation of the antenna 8. Therefore, the corrector circuit is provided with a second vacuum tube 35 provided with a grid 36. This grid is connected along with the grid 27 of vacuum tube 26 to the source of synchronizing pulses SP. Vacuum tube 35 functions in the same manner as vacuum tube 26 and connects the grid 37 of tube 33 to ground through conductor 38 at the time of the synchronizing pulse SP. Thus, the second trigger circuit will likewise generate its square wave in proper relation to the rotation of the antenna 8.

Perhaps mention should be made that the signals (Fig. 4) are directly related to the four different quadrant positions of the rotating antenna assembly 8 and, therefore, to the positions of the "skewed" beam radiated thereby. Let it be assumed that R indicates that the antenna beam is skewed horizontally to the right and D indicates that this beam is skewed vertically downward while L indicates that the beam is skewed horizontally to the left and U indicates that the beam is skewed vertically upward. Then the polarities of $E_0$ and $E_3$, which are present at the respective outputs of trigger circuits #1 and #2, are given by the following table:

| Direction of deflection of beam | Polarities | |
|---|---|---|
| | $E_0$ | $E_3$ |
| R | + | + |
| D | − | + |
| L | + | − |
| U | − | − |

It will be understood that this system may be extended to generate other square waves and to have them properly synchronized with respect to the rotation of the antenna, by adding successive trigger circuits to the chain and by adding to the corrector circuit in the manner already indicated.

What we claim is:

1. In a radio locator, an antenna recurrently movable over a given excursion path for transmitting exploring pulses and for intercepting said exploring pulses when reflected back thereto, a motor for moving said antenna along said path, a receiver of intercepted exploring pulses, said receiver including a display tube and a trigger circuit, said trigger circuit being operated in response to trigger pulses for generating control waves to govern said display tube whereby said tube displays images of targets located by said exploring pulses, generator mechanism driven by said motor to generate a plurality of trigger pulses for initiating the several operations of said trigger circuit during each excursion of said antenna, means including said generator mechanism for generating a supplemental pulse in the course of the excursions of said antenna and in proper timing relation to a given position of said antenna, and means responsive to a supplemental pulse for synchronizing the trigger circuit with respect to a given position of said antenna along said path.

2. In a radio locator, an antenna recurrently movable over a given excursion path for transmitting exploring pulses and for intercepting said exploring pulses when reflected back thereto, a motor for moving said antenna along said path, a receiver of intercepted exploring pulses, said receiver including a display tube and a trigger circuit, said trigger circuit being operated in response to trigger pulses for generating control waves to govern said display tube whereby said tube displays images of targets located by said exploring pulses, generator mechanism driven by said motor to generate a plurality of trigger pulses for initiating various operations of said trigger circuit during each excursion of said antenna, means including said generator mechanism for generating a supplemental pulse during each excursion of said antenna and in proper timing relation to a given position of said antenna, and means responsive to said supplemental pulses for synchronizing the trigger circuit with respect to said given position of said antenna along said path.

3. In a radio locator, a rotatable antenna for transmitting exploring pulses and for intercepting said exploring pulses when reflected back thereto, a motor for rotating said antenna, a receiver of exploring pulses, said receiver including a display tube and a trigger circuit, said trigger circuit being operated in response to trigger pulses for generating control waves to govern said display tube whereby said tube displays images of targets located by said exploring pulses, generator mechanism driven by said motor to generate a plurality of trigger pulses for initiating various operations of said trigger circuit during each rotation of said antenna, means including said generator mechanism for generating a supplemental pulse during each rotation of said antenna, and means including said supplemental pulses for synchronizing the trigger circuit with said given position of said antenna.

4. In a radio locator, an antenna recurrently movable over a given excursion path for transmitting exploring pulses and for intercepting said exploring pulses when reflected back thereto, a motor for moving said antenna along said path, a receiver of intercepted exploring pulses, said receiver including a display tube and a trigger circuit, said trigger circuit being operated in response to trigger pulses for generating square waves to control said display tube whereby said tube displays images of targets located by said exploring pulses, said trigger circuit having two stable states of equilibrium for generating said square waves, pulse controlled means for causing said trigger circuit to change alternately from one stable equilibrium state to the other state, means for generating said pulses, and pulse controlled means coordinated with a given position of said antenna for insuring a predetermined state of equilibrium of said circuit.

5. In a radio locator, a rotatable antenna for transmitting exploring pulses and for intercepting said exploring pulses when reflected back thereto, a motor for rotating said antenna, a receiver of intercepted exploring pulses, said receiver including a display tube and a trigger circuit, said trigger circuit being operated in response to trigger pulses for generating square waves to control said display tube whereby said tube displays images of targets located by said exploring pulses, said trigger circuit having two stable states of equilibrium for generating waves, pulse controlled means for causing said circuit to change alternately from one stable state to the other stable state, means for generating said pulses, and pulse controlled means coordinated with a given position of said antenna for insuring a predetermined state of equilibrium of said circuit.

6. In a radio locator system, a rotatable antenna for receiving impulses from a distant point, a motor for rotating said antenna, a receiver including a display tube together with sweep circuits associated therewith, a trigger circuit for generating waves to operate said sweep circuits, whereby said tube displays images in accordance with the received impulse signals, said trigger circuit comprising two vacuum tubes connected in a network and operating alternately to have two stable states of equilibrium, means including periodic trigger pulses for initiating the operation of first one vacuum tube and then the other, and means operated by said motor and coordinated with a predetermined position of said antenna for insuring the operation of a given one of said vacuum tubes in the event that it does not happen to be in operation at the time that said antenna is in said predetermined position.

7. In a radio locator system, a rotatable antenna for receiving impulses from a distant point, a motor for rotating said antenna, a receiver including a display tube together with sweep circuits associated therewith, a trigger circuit for generating waves to operate said sweep circuits, whereby said tube displays images in accordance with the received impulses, said trigger circuit comprising two vacuum tubes connected in a network and operating alternately to have two stable states of equilibrium, means driven by said motor for generating periodic trigger pulses, means including said trigger pulses for normally initiating the operation of first one vacuum tube and then the other, and means operated by said motor and coordinated with a predetermined position of said antenna for generating dominating pulses, and means responsive to a dominating pulse for insuring the operation of a predetermined vacuum tube when said antenna is in a give position.

8. In a radio locator system, a rotatable antenna for receiving impulses from a distant point, a motor for rotating said antenna, a receiver including a display tube together with sweep circuits associated therewith, a trigger circuit for generating waves to operate said sweep circuits, whereby said tube displays images in accordance with the received impulses, said trigger circuit comprising two vacuum tubes connected in a network and operating alternately to have two stable states of equilibrium, means driven by said motor for generating periodic trigger pulses, means including said trigger pulses for normally initiating the operation of first one vacuum tube and then the other, and means operated by said motor and coordinated with a predetermined position of said antenna for generating dominating pulses, and means including a vacuum tube responsive to a dominating pulse for insuring the operation of a predetermined vacuum tube when said antenna is in a given position.

9. In a radio locator system, a rotatable antenna for transmitting exploring pulses and for intercepting said exploring pulses when reflected back thereto, a motor for rotating said antenna, a receiver of intercepted exploring pulses, said receiver including a pair of display tubes and a pair of trigger circuits, said trigger circuits being operated in response to control pulses for generating sets of square waves to control said display tubes, whereby said tubes display images of targets located by said exploring pulses, each trigger circuit having two stable states of equilibrium alternately effective for generating a set of square waves, the frequency of one set of square waves being a multiple of that of the other set of square waves, and pulse controlled means coordinated with a given position of said antenna for insuring predetermined states of equilibrium of said trigger circuits.

10. In a radio locator, antenna means for transmitting a beam of exploring pulses and for intercepting said exploring pulses when reflected back thereto, said beam being recurrently movable over a given excursion path, means including a motor for moving said beam along said path, a receiver of intercepted exploring pulses, said receiver including a display tube and a trigger circuit, said trigger circuit being operated in response to trigger pulses for generating control waves to govern said display tube whereby said tube displays images of targets located by said exploring pulses, generator mechanism driven by said motor to generate a plurality of trigger pulses for initiating the several operations of said trigger circuit during each excursion of said beam, means including said generator mechanism for generating a supplemental pulse in the course of the excursions of said beam and in proper timing relation to a given position of said beam, and means responsive to a supplemental pulse for synchronizing the trigger circuit with respect to a given position of said beam along said path.

11. In a radio locator, antenna means for transmitting a beam of exploring pulses and for intercepting said exploring pulses when reflected back thereto, said beam being recurrently movable over a given excursion path, means including a motor for moving said beam along said path, a receiver of intercepted exploring pulses, said receiver including a display tube and a trigger circuit, said trigger circuit being operated in response to trigger pulses for generating square waves to control said display tube whereby said tube displays images of targets located by said exploring pulses, said trigger circuit having two stable states of equilibrium for generating said square waves, pulse controlled means for causing said trigger circuit to change alternately from one stable equilibrium state to the other state, means for generating said pulses, and pulse controlled means coordinated with a given position of said beam for insuring a predetermined state of equilibrium of said circuit.

12. In a radio locator system, a movable antenna for receiving impulses from a distant point, a motor for moving said antenna, a receiver including a display tube together with sweep circuits associated therewith, a trigger circuit for generating waves to operate said sweep circuits, whereby said tube displays images in accordance with the received impulse signals, said trigger circuit comprising two vacuum tubes connected in a network and operating alternately to have two stable states of equilibrium, means including periodic trigger pulses for initiating the operation of first one vacuum tube and then the other, a control vacuum tube normally biased to cut-off, means including a synchronizing pulse coordinated with a predetermined position of said antenna for rendering said control vacuum tube conducting, and means responsive to the conduction of the control vacuum tube for insuring the operation of a given one of said pair of vacuum tubes in the event that it does not happen to be in operation at the time that said antenna is in said predetermined position.

13. In a radio locator system, a movable antenna for receiving impulses from a distant point, a motor for moving said antenna, a receiver including a display tube together with sweep circuits associated therewith, a trigger circuit for generating waves to operate said sweep circuits, whereby said tube displays images in accordance with the received impulse signals, said trigger circuit comprising a pair of vacuum tubes connected in a network and operating alternately to have two stable states of equilibrium, means including periodic trigger pulses for initiating the operation of first one vacuum tube and then the other, a control circuit for insuring the operation of a given one of said pair of vacuum tubes in the event that it does not happen to be in operation at the time that said antenna is in a predetermined position, a control vacuum tube provided with a cathode, an anode and a grid, said control vacuum tube being normally biased to cut-off, and means including a synchronizing pulse coordinated with a predetermined position of said antenna and applied to said grid for rendering said control vacuum tube conducting, said control circuit including said cathode and said anode and being completed in response to the conduction of said control vacuum tube.

HAROLD GOLDBERG.
WALTER C. THOMPSON.